(No Model.) 2 Sheets—Sheet 1.
G. W. CAMPBELL.
WINDMILL.
No. 481,712. Patented Aug. 30, 1892.
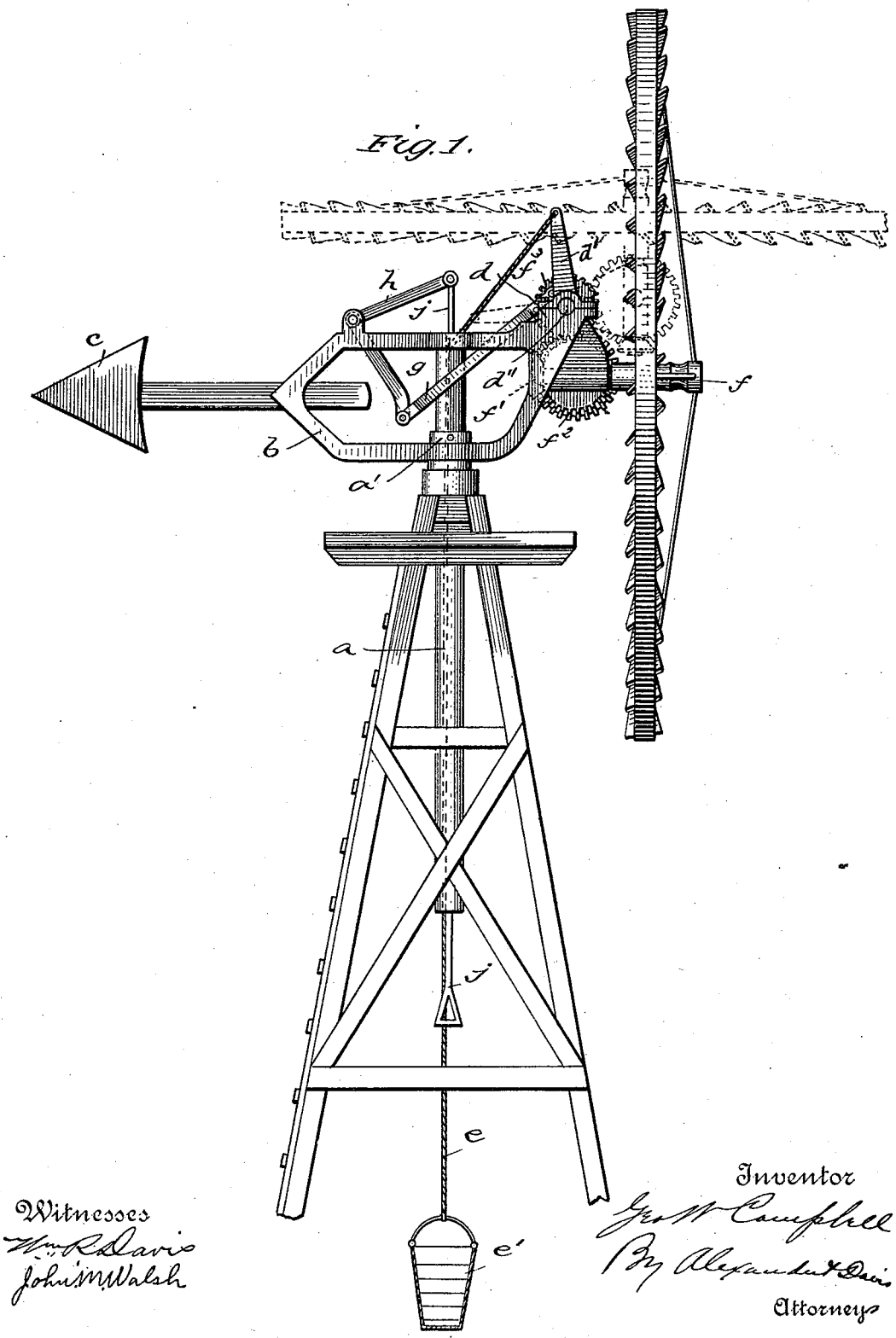

(No Model.) 2 Sheets—Sheet 2.
G. W. CAMPBELL.
WINDMILL.
No. 481,712. Patented Aug. 30, 1892.
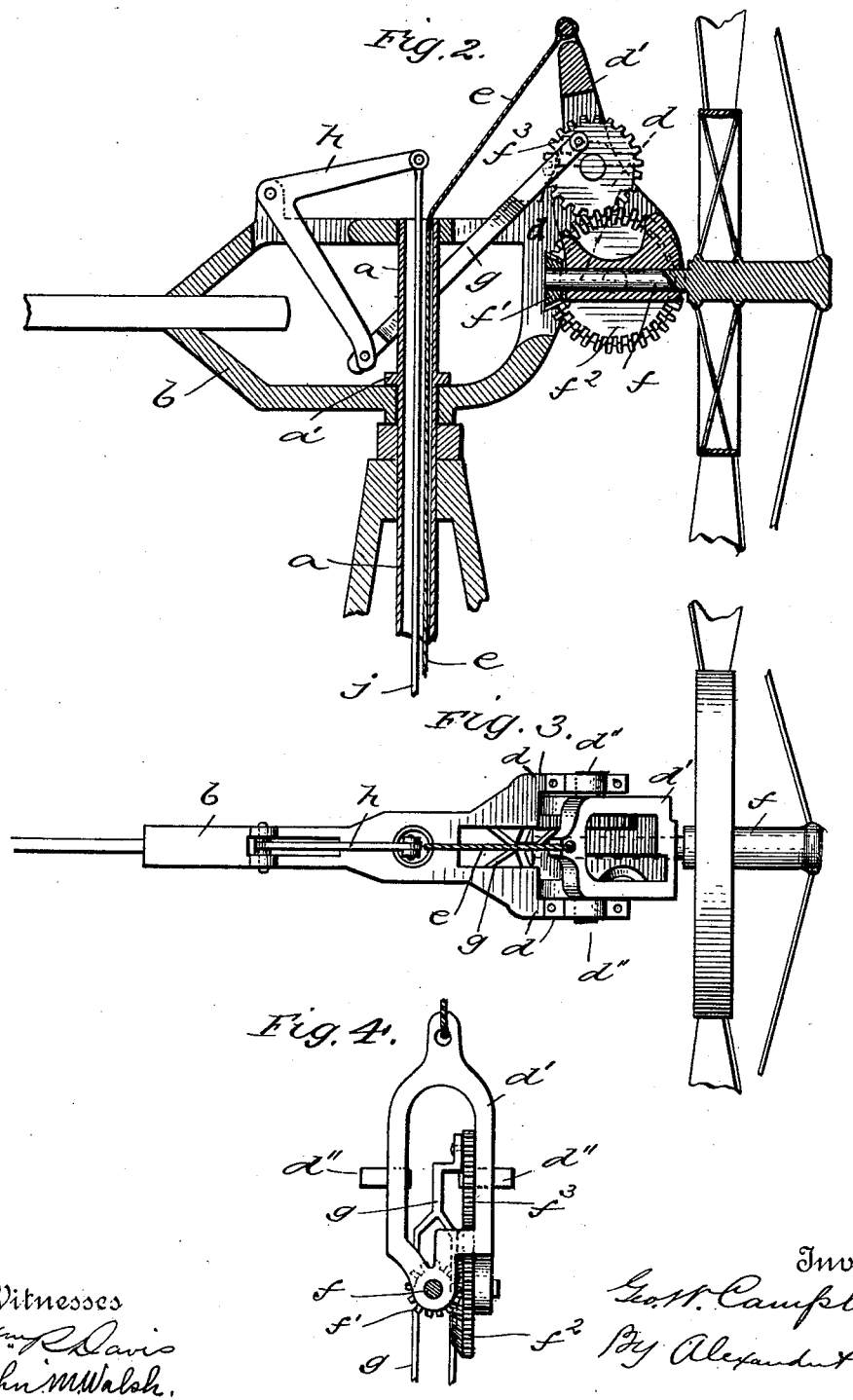

UNITED STATES PATENT OFFICE.

GEORGE W. CAMPBELL, OF EL PASO, TEXAS, ASSIGNOR TO JOHN V. TAGGART AND JAMES H. BOONE, OF SAME PLACE, AND FRANK BROWN, JR., OF AUSTIN, TEXAS.

WINDMILL.

SPECIFICATION forming part of Letters Patent No. 481,712, dated August 30, 1892.

Application filed December 22, 1891. Serial No. 415,875. (No model.)

*To all whom it may concern:*

Be it known that I, GEORGE W. CAMPBELL, a citizen of the United States, residing at El Paso, in the county of El Paso and State of Texas, have invented certain new and useful Improvements in Windmills, of which the following is a specification, reference being had therein to the accompanying drawings, in which—

Figure 1 represents a side elevation of my windmill; Fig. 2, a vertical sectional view of the same; Fig. 3, a plan view, and Fig. 4 a detail view, of the pivoted frame carrying the gearing.

The main objects I have in view are to produce a substantial and strong machine capable of withstanding the high winds of the western prairies, which will be at the same time inexpensive and simple in construction, and which will automatically regulate itself in such a manner as to run with a uniform speed in all kinds of winds, as will more fully hereinafter appear.

The invention has other minor objects in view, which will appear in the course of this specification.

In the drawings, $a$ designates a vertical open-ended tube mounted centrally within a tower of suitable construction, a collar $a'$ being formed on or secured to this tube above the upper end of the tower. Journaled on the upper end of the tube is an open revolving frame $b$, which carries at one end the wheel and gearing and at its other end the counterbalancing-weight $c$, which latter is preferably in the form of an arrow-head secured on the forward end of a bar projecting forwardly from the frame. The rear end of the frame $b$ is turned upwardly and bifurcated to form arms $d$, between which the gearing is located. Between the arms formed by the bifurcation is an open frame $d'$, provided with horizontal trunnions $d''$ on its side edges, said trunnions being journaled on the upper ends of the arms $d$. Connected to the upper end of this pivoted frame $d'$ is a cord or wire $e$, which runs down through the vertical tube and has attached to it a bucket $e'$, in which are placed suitable weights. The horizontal shaft $f$ of the wind-wheel is journaled in the lower end of the frame $d'$, and on the forward end of this shaft is secured a bevel-pinion $f'$, which meshes with a larger gear-wheel $f^2$, journaled on the frame $d$, this latter wheel meshing with a similar wheel $f^3$, journaled immediately above it on the swinging frame.

Pivotally connected to a wrist-pin on the face of wheel $f^3$ is a reciprocating rod $g$, which is preferably bifurcated to embrace the vertical tube, and which has its forward end pivotally connected to the lower arm of an angle-lever $h$, pivoted and working in a slot in the upper bar of the revolving frame in front of the vertical tube. The upper arm of this angle-lever is pivotally connected to the upper end of the usual working rod $j$, which is extended down through the tube and connected to the pump-rod or other work to be performed. The wheel employed is of the ordinary pattern having rigid blades.

In operation, as will be perceived, the rotation of the wheel imparts through the intermediate gearing and connecting-rods the usual reciprocating movement to the working rod. Owing to the difference in diameter in the driving-pinion and the other gear-wheels the working rod makes but one complete stroke while the wheel is revolving twice, the advantage of which is that the wheel will start in a lighter wind than if higher geared. In other words, the wheel will start and run with one-half the pressure it requires to start wheels geared in the ordinary manner, the working rod making long easy strokes, as is evident. The relative sizes of the gear-wheels may of course be varied, if desired, without departing from the invention.

This wind-wheel is not provided with a vane or springs or pivoted blades to regulate its movement according to the direction and strength of the wind, for it does not require them. The wheel automatically adjusts itself according to the strength and direction of the wind and insures a uniform speed and stroke to the working rod irrespective of the strength and direction of the wind. The wheel swings around and shifts itself automatically, so that the arrow-headed weight always points in the direction from which the wind is blowing. It will be observed that the swinging frame upon which the wheel is journaled is pivoted some distance above the shaft of the wheel, so that the wheel may automatically adjust itself to varying winds. In case the wind increases in velocity beyond a predetermined degree the wheel automatically swings up to or toward a horizontal position, according to the strength of the wind, the wheel when in or near a horizontal position lying above the gearing with its upper edge presented to the wind. It will be observed that the reason of this is that the working area of the blades is greater below the pivoted point of its hanger than above such pivotal point, this preponderance of blade area necessarily causing the wind when it attains a speed beyond a predetermined point to swing the lower part of the wheel backwardly and its upper part forwardly, the angle the wheel assumes with respect to the wind being always determined by the strength thereof. It will also be observed that by reason of the foregoing arrangement and the locating of the gearing upon the swinging frame the stroke of the working rod will always be uniform in length and speed irrespective of the position of the wheel or strength of the wind.

Another essential feature of this invention is the manner in which the speed of the wheel is regulated. This is done by the weighted bucket connected by a wire to the upper end of the swinging frame which carries the wheel. By increasing or decreasing the weight of the bucket (which is done by removing or placing therein suitable weights) the wheel may be so balanced that it will be more or less sensitive to the action of the wind and will therefore take a weaker or stronger current to swing it toward a horizontal position.

The wheel may at any time be readily thrown to a horizontal position out of operation by drawing down the weight-cord and suitably fastening it, as is evident.

Having thus fully described my invention, what I claim, and desire to secure by Letters Patent, is—

1. In a windmill, the combination of a tower, a rotatable frame mounted thereon, a counterbalancing-weight upon the front end of this frame, a vertically-swinging frame, pivotally supported upon the rear end of the rotatable frame, an operating-cord connected to the swinging frame above its pivotal point, a wind-wheel having its shaft journaled in the lower end of the vertically-swinging frame, the axis of the wind-wheel shaft being below the axis of the swinging frame, a gear-wheel on the wind-wheel shaft, gearing supported on the swinging frame and meshing with the gear-wheel on the wind-wheel shaft, and operating mechanism connected to the gearing, substantially as described.

2. The combination of a tower, a vertical tube thereon, a revolving frame on said tube, an upright swinging frame pivoted on the other end of said revolving-frame, a wind-wheel having its shaft journaled in the lower end of the latter frame and provided with a bevel-pinion, gear-wheels journaled on said swinging-frame and meshing with said pinion, a forwardly-extending connecting-rod connected to one of said gear-wheels, an angle-lever pivoted on the revolving frame and having one of its arms attached to said connecting-rod, and a working rod connected to the other arm of said angle-lever and extending down through the vertical tube, substantially as described.

3. The combination of a revolving frame, an upright swinging frame pivoted on the rear end of said frame, a wind-wheel having its shaft journaled on the lower end of said swinging frame below its pivotal point, operating mechanism connected to said wheel-shaft, and a depending cord or wire connected to the upper end of said swinging frame above its pivotal point and carrying a variable weight at its lower end, substantially as described.

4. The combination of a tower, a tube thereon, a rotatable frame on said tube and having its rear end provided with arms $d\ d$, a counter-balance on its forward end, an open frame $d'$, journaled between the arms $d\ d$, a wind-wheel having its shaft journaled in the frame $d'$ below its pivotal point, a bevel-gear on said shaft, a bevel-gear $f^2$, journaled in the frame $d'$ and meshing with the gear on the shaft, a gear $f^3$, journaled in the swinging frame and meshing with the gear $d$, a rod $g$, connected to the gear $f^3$, and means connecting this rod to the operating-cord connected to the upper end of the swinging frame $d'$ and extended down through the tube and carrying an adjustable weight, substantially as described.

In testimony whereof I affix my signature in presence of two witnesses.

GEORGE W. CAMPBELL.

Witnesses:
 HOWELL BROWN,
 J. H. CATLIN.